E. A. JOHNSTON.
CHANGEABLE SPEED GEARING.
APPLICATION FILED NOV. 30, 1908.
932,611.
Patented Aug. 31, 1909.
2 SHEETS—SHEET 1.
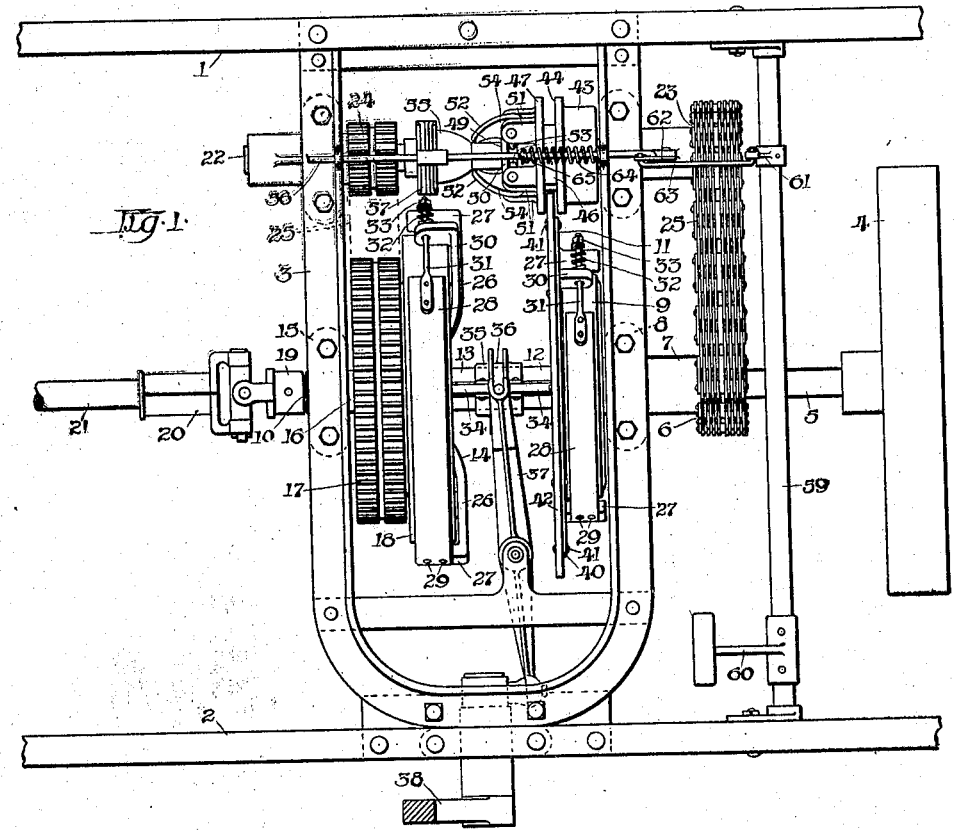

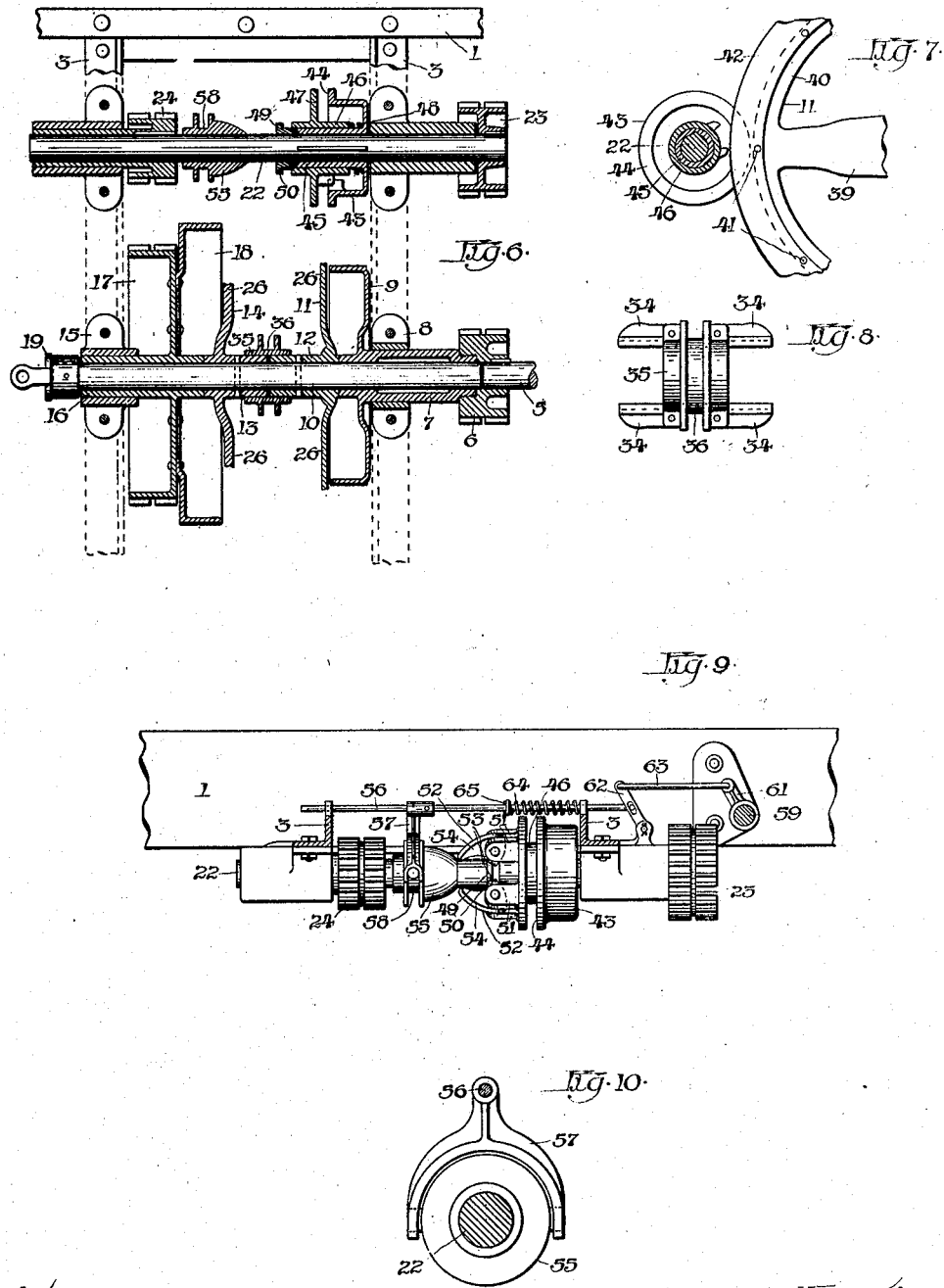

UNITED STATES PATENT OFFICE.

EDWARD A. JOHNSTON, OF AKRON, OHIO, ASSIGNOR TO INTERNATIONAL HARVESTER COMPANY, A CORPORATION OF NEW JERSEY.

CHANGEABLE-SPEED GEARING.

932,611.

Specification of Letters Patent.   Patented Aug. 31, 1909.

Application filed November 30, 1908.   Serial No. 465,340.

*To all whom it may concern:*

Be it known that I, EDWARD A. JOHNSTON, a citizen of the United States, residing at Akron, in the county of Summit and State of Ohio, have invented certain new and useful Improvements in Changeable-Speed Gearing, of which the following is a specification.

My invention relates to changeable speed gearing and reversing mechanism, and is particularly designed for operation in connection with motion transmitting means when used in automobile construction, the object of my invention being to provide a mechanism having few parts, strong and durable in its construction and efficient in operation. These objects are attained by means of the mechanism illustrated by the accompanying drawings, in which—

Figure 1 represents a detached plan view of the changeable speed gear mechanism and part of the frame structure of an automobile having my invention mounted thereon; Fig. 2 is a detached detail drawing representing a part of the clutch mechanism; Fig. 3 is a similar view designed to show the manner of operating the clutch mechanism; Fig. 4 is a side elevation of Fig. 3; Fig. 5 is a cross section of Fig. 2; Fig. 6 is a longitudinal section of a part of the mechanism shown in Fig. 1; Fig. 7 is a detached detail representing a part of the reversing clutch mechanism; Fig. 8 represents a detached detail illustrating part of the clutch shipping mechanism; Fig. 9 is a plan view of the motion reversing clutch mechanism; and Fig. 10 is a detached detail representing the clutch shipper fork.

Like reference numerals designate the same parts throughout the several views.

1 and 2 represent members of the frame structure of an automobile; 3 is a gear frame secured to members 1 and 2, and upon which the transmission gear is mounted.

4 represents the fly wheel of an engine, and 5 an engine or other driving shaft having a pinion 6 secured thereto. The pinion is also secured to a sleeve 7 journaled in a bearing 8 secured to the gear frame, the sleeve having integral therewith, at its opposite end, a friction clutch member 9. A shaft 10 is journaled in the sleeve in axial alinement with the driving shaft, and secured thereto, adjacent the clutch member 9, is a clutch operating member 11, having a hub portion 12, and abutting the hub is a hub 13, also secured to the shaft and forming part of a clutch operating member 14 similar in form to member 11. Journaled in a bearing 15, upon the opposite side of the gear frame, is a sleeve 16, having integral therewith a gear wheel 17, and 18 represents a clutch member secured to said gear wheel. The shaft 10 extends beyond the sleeve, and secured thereto is a member 19 forming part of a universal coupling 20, connecting the shaft with a supplemental driving shaft 21.

22 represents a countershaft journaled in bearings secured to the gear frame and arranged parallel with the shaft 10; and 23 and 24 represent gear members adapted to have flexible connection with the pinion 6 and gear wheel 17, respectively, as by means of a chain, as represented by reference numeral 25.

The clutch members 11 and 14 include oppositely disposed arms 26, having outwardly projecting ear portions 27, to which is secured one end of band brake member 28 by means of rivets 29, the opposite ends of said brake members being connected with the oute rarms of the bell crank levers 30 by means of links 31 passing through openings in the levers and adapted to receive springs 32 and adjusting nuts 33 in a manner to form a yielding connection between the levers and brake members. The levers are pivotally mounted upon the arms 26, and their inner arms are provided with rollers adapted to engage with inclined shoes 34, arranged longitudinally relative to the axis of the clutch members, and mounted upon a clutch shipping ring 35, having annular grooves 36, the ring being adapted to slide upon the hubs 12 and 13; and 37 represents a lever pivotally connected with the gear frame, having one end engaging with the clutch shipping ring 35 and its opposite end connected with a hand lever mechanism 38 within reach of the hand of the operator. The clutch member 11, in addition to the arms 26, is provided with other oppositely disposed arms 39 and a rim portion 40, to which is secured, by means of rivets 41, an annular steel disk 42.

Secured to the countershaft 22 is a friction clutch member 43 having a friction face 44 and a hub portion 45 and slidably mounted upon said hub is a sleeve 46, having integral therewith a friction disk 47, the two friction disks being normally held apart by the action of a coiled spring 48 interposed between the inner end of the sleeve 46 and the adjacent wall of member 43, the friction faces of the disks being adapted to engage with opposite sides of the annular disk 42. A thimble 49 is secured to the end of the sleeve 46, having a collar 50, and 51 represents a series of pairs of longitudinally projecting ears secured to the friction disk 47, and between each pair of ears is pivotally mounted a clutch operating member 52, having inwardly projecting arms 53 adapted to engage with the collar 50, and longitudinally projecting arms 54 designed to engage with a sliding cone 55 mounted adjacent thereto upon the countershaft. A clutch shipping rod 56 is slidably mounted upon the gear frame, and secured thereto is a fork 57, having inwardly projecting members adapted to be received by an annular groove 58 formed upon the body of the sliding cone.

Journaled in bearings secured to frame members 1 and 2, is a rock-shaft 59, and secured to one end thereof is a foot lever 60, and 61 represents an arm secured to its opposite end, which arm is connected to the outer end of the lever 62 by means of a link 63, one end of the lever being pivotally connected with the gear frame and its middle portion provided with a slotted opening adapted to connect the lever with rod 56 in a manner to give a sliding movement to the rod when the rock-shaft is turned in its bearings, and 64 represents a coiled spring surrounding the rod and operative between a pin 65 in the rod and a part of the gear frame to move the rod in one direction.

The operation of the mechanism is as follows: Motion is transmitted from the engine shaft to pinion 6, sleeve 7 and clutch member 9, and pinion 6 transmits motion to the shaft 22 by means of chain 25, the countershaft communicating motion to gear wheel 17 through pinion 24 and a chain similar to 25, the above parts deriving constant motion from the engine shaft. When the clutch operating ring 35 is adjusted toward the clutch member 11, the clutch band is caused to engage with the clutch member 9, and shaft 10 is thereby caused to rotate at the same speed as that of the engine shaft and in the same direction. If the clutch operating ring is moved toward the clutch operating member 14, its clutch band is caused to engage with clutch member 18, and a slower motion is thereby communicated from the countershaft 22 through pinion 24 and gear wheel 17. If the rock shaft 59 is turned in one direction, it will, through its connection with the sliding cone 55, cause the clutch members 43 and 47 to engage with the annular disk 42 and thereby rotate clutch member 11 and shaft 10 in a reverse direction.

What I claim as my invention, and desire to secure by Letters Patent, is:

A speed changing mechanism including, in combination, a gear frame, bearing boxes secured to said gear frame, an engine shaft, a pinion secured thereto, sleeves journaled in said bearing boxes in axial alinement with said engine shaft, an auxiliary shaft journaled in said sleeves, one of said sleeves being secured to said engine shaft in a manner to rotate therewith, a countershaft journaled upon said gear frame parallel with said engine shaft, a gear member secured to said countershaft, a flexible connection between said gear member and said pinion, clutch devices secured to the auxiliary shaft, said clutch devices including an annular disk, and an adjustable friction gear mechanism mounted upon said countershaft and adapted to engage said annular disk in a manner to communicate rotative movement to said auxiliary shaft.

EDWARD A. JOHNSTON.

Witnesses:
W. L. CARLTON,
F. G. RUSSELL.